(12) United States Patent
Pajukoski et al.

(10) Patent No.: US 10,652,062 B2
(45) Date of Patent: May 12, 2020

(54) CONFIGURABLE WAVEFORM FOR BEYOND 52.6GHZ

(71) Applicant: NOKIA TECHNOLOGIES OY, Espoo (FI)

(72) Inventors: Kari Pajukoski, Oulu (FI); Frederick Vook, Schaumburg, IL (US); Rapeepat Ratasuk, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/136,802

(22) Filed: Sep. 20, 2018

(65) Prior Publication Data

US 2020/0099562 A1    Mar. 26, 2020

(51) Int. Cl.
*H04L 27/26* (2006.01)
*H04L 5/00* (2006.01)
*H04L 27/34* (2006.01)
*H04W 72/04* (2009.01)

(52) U.S. Cl.
CPC ........ *H04L 27/2607* (2013.01); *H04L 5/0007* (2013.01); *H04L 27/2636* (2013.01); *H04L 27/2666* (2013.01); *H04L 27/3472* (2013.01); *H04W 72/042* (2013.01); *H04W 72/0446* (2013.01)

(58) Field of Classification Search
CPC .................................................. H04L 27/2607
USPC ........................................................ 370/329
See application file for complete search history.

(56) References Cited

U.S. PATENT DOCUMENTS

| | | | |
|---|---|---|---|
| 2012/0230300 A1* | 9/2012 | Goerke | H04B 7/18539 370/335 |
| 2015/0009883 A1* | 1/2015 | Bai | H04L 5/0007 370/312 |
| 2019/0150124 A1* | 5/2019 | Nogami | H04W 72/042 370/330 |
| 2019/0158331 A1* | 5/2019 | Pawar | H04L 5/0051 |
| 2019/0190644 A1* | 6/2019 | Ugurlu | H04W 76/11 |
| 2019/0254024 A1* | 8/2019 | Nam | H04L 27/2602 |
| 2019/0254053 A1* | 8/2019 | Ying | H04W 72/0446 |
| 2019/0254064 A1* | 8/2019 | Islam | H04L 43/0817 |
| 2019/0261315 A1* | 8/2019 | Zhang | H04J 11/0069 |
| 2019/0268202 A1* | 8/2019 | Levinbook | H04L 27/2636 |

(Continued)

OTHER PUBLICATIONS

Qualcomm, "New SID on NR waveform beyond 52.6GHz", 3GPP TSG RAN Meeting #79, Chennai, India, Mar. 19-22, 2019, RP-180453, 4 pages.

(Continued)

*Primary Examiner* — Peter G Solinsky
(74) *Attorney, Agent, or Firm* — Squire Patton Boggs (US) LLP

(57) ABSTRACT

Various communication systems may benefit from new slot formats to support dynamic allocation between SC and CP-OFDMA. In accordance with some embodiments, a method may include transmitting, by a network entity, at least one physical downlink slot containing at least one physical downlink shared channel (PDSCH) and at least one physical downlink control channel (PDCCH). The at least one PDCCH is associated with at least one subcarrier waveform without a cyclic prefix (CP). The at least one PDSCH is associated with at least one CP-orthogonal frequency division multiplexing (OFDM) or single carrier (SC) waveform.

19 Claims, 3 Drawing Sheets

205 — transmitting, by a network entity, at least one physical downlink slot, wherein the at least one PDCCH is transmitted according to at least one zero tail discrete fourier transform (DFT)-spread-orthogonal frequency division multiplexing (S-OFDM) with at least one zero or low power cyclic prefix (CP)

(56) References Cited

U.S. PATENT DOCUMENTS

2019/0274161 A1* 9/2019 Nakao ............... H04W 72/042
2019/0281607 A1* 9/2019 Gao .................. H04W 72/085

OTHER PUBLICATIONS

Intel Corporation, "New SID: Study on NR design above 52.6GHz", 3GPP TSG RAN Meeting #79, Chennai, India, Mar. 19-22, 2018, RP-180320, 4 pages.

Kulkarni et al., "Coverage and Rate Trends in Moderate and High Bandwidth 5G Networks", Globecom 2014 Workshop—Mobile Communications in Higher Frequency Bands, Dec. 2014, pp. 422-426.

Nokia et al., "Potential for system level gains with low PAPR waveforms", 3GPP TSG-RAN WG1#86, Gothenburg, Sweden, Aug. 22-26, 2016, R1-167795, 5 pages.

Nokia et al., "Waveform proposal for carrier frequencies beyond 40 GHz", 3GPP TSG-RAN WG1#86, Gothenburg, Sweden, Aug. 22-26, 2016, R1-167794, 7 pages.

MCC Support, "Final Report of 3GPP TSG RAN WG1 #86 v1.0.0, (Gothenburg, Sweden, Aug. 22-26, 2016)", 3GPP TSG RAN WG1 Meeting #86bis, Lisbon, Portugal, Oct. 10-14, 2016, R1-1608562, 154 pages.

MCC Support, "Final Report of 3GPP TSG RAN WG1 #86bis v1.0.0, (Lisbon, Portugal, Oct. 10-14, 2016)", 3GPP TSG RAN WG1 Meeting #87, Reno, USA, Nov. 14-18, 2016, R1-1611081, 160 pages.

Interdigital Communications, "Waveform design considerations for carrier frequencies above 40 GHz", 3GPP TSG RAN WG1 Meeting #86bis, Lisbon, Portugal, Oct. 10-14, 2016, R1-1609889, 8 pages.

Mitsubishi Electric, "Analysis of UW-DFT-s-OFDM", 3GPP TSG RAN WG1 Meeting #88bis, Spokane, USA, Apr. 3-7, 2017, R1-1705820, 7 pages.

* cited by examiner

Figure 2a

201 — transmitting, by a network entity, at least one physical downlink slot containing at least one physical downlink shared channel (PDSCH) and at least one physical downlink control channel (PDCCH)

Figure 2b

203 — transmitting, by a network entity, at least one slot containing at least one physical downlink shared channel (PDSCH)

Figure 2c

205 — transmitting, by a network entity, at least one physical downlink slot, wherein the at least one PDCCH is transmitted according to at least one zero tail discrete fourier transform (DFT)-spread-orthogonal frequency division multiplexing (S-OFDM) with at least one zero or low power cyclic prefix (CP)

Figure 2d

207 — transmitting, by a user equipment, at least one physical downlink shared control channel (PDSCH) comprising one or more layers from at least one transmission reception point (TRP)

CONFIGURABLE WAVEFORM FOR BEYOND 52.6GHZ

BACKGROUND

Field

Various communication systems may benefit from improved waveform techniques. For example, certain communication systems may benefit from improved new slot formats supporting single carrier and cyclic prefix orthogonal frequency division multiplexing.

New Radio Release-15 relates to wireless operations for frequencies up to 52.6 GHz. The downlink waveform is Cyclic Prefix Orthogonal Frequency Division Multiplexing (CP-OFDM). Next Generation (NG) systems above 52.6 GHz will need to accommodate increased path loss, larger arrays, and less efficient RF components such as power amplifiers (PAs). SC waveforms are preferred over OFDM because of their low PAPR properties. The low PAPR waveform enables PAs to run at a higher power to maintain coverage. CP-OFDM modulation would be beneficial for non-power limited UEs utilizing MIMO or higher order modulation. Hence, systems above 52.6 GHz need to support both SC and CP-OFDM waveforms. In CP-less SC waveforms, the CP is replaced by zero samples of known samples which are a part of symbols. CP-less waveforms, such as Zero Tail and UW-DFT-OFDM (ZT-DFT-S OFDMA) are promising SC waveforms for beyond 52.6 GHz because the null CP portion may be used to switch RF beams without destroying the CP property. In addition, the length of a cyclic part may be adjusted arbitrarily without changing the frame-structure numerology

Description of the Related Art

Dynamic allocations between CP-less SC and CP-OFDM exist under IEEE radio standard 802.11ad. Different sampling rates may be used between CP-less SC and CP-OFDM in order to equalized symbol lengths.

SUMMARY

In accordance with some embodiments, a method may include transmitting, by a network entity, at least one physical downlink shared channel (PDSCH) slot and at least one physical downlink control channel (PDCCH). The PDCCH may be associated with at least one waveform without a cyclic prefix (CP). The PDSCH may be associated with at least one CP-orthogonal frequency division multiplexing access (OFDMA).

In accordance with some embodiments, an apparatus may include means for transmitting at least one physical downlink shared channel (PDSCH) slot and at least one physical downlink control channel (PDCCH). The PDCCH may be associated with at least one subcarrier waveform without a cyclic prefix (CP). The PDSCH may be associated with at least one CP-orthogonal frequency division multiplexing access (OFDMA).

In accordance with some embodiments, an apparatus may include at least one processor and at least one memory including computer program code. The at least one memory and the computer program code can be configured to, with the at least one processor, cause the apparatus to at least transmit at least one physical downlink shared channel (PDSCH) slot and at least one physical downlink control channel (PDCCH). The PDCCH may be associated with at least one subcarrier waveform without a cyclic prefix (CP). The PDSCH may be associated with at least one CP-orthogonal frequency division multiplexing access (OFDMA).

In accordance with some embodiments, a non-transitory computer readable medium can be encoded with instructions that may, when executed in hardware, perform a method. The method may transmit at least one physical downlink shared channel (PDSCH) slot and at least one physical downlink control channel (PDCCH). The PDCCH may be associated with at least one subcarrier waveform without a cyclic prefix (CP). The PDSCH may be associated with at least one CP-orthogonal frequency division multiplexing access (OFDMA).

In accordance with some embodiments, a computer program product may perform a method. The method may transmit at least one physical downlink shared channel (PDSCH) slot and at least one physical downlink control channel (PDCCH). The PDCCH may be associated with at least one subcarrier waveform without a cyclic prefix (CP). The PDSCH may be associated with at least one CP-orthogonal frequency division multiplexing access (OFDMA).

In accordance with some embodiments, an apparatus may include circuitry configured to transmit at least one physical downlink shared channel (PDSCH) slot and at least one physical downlink control channel (PDCCH). The PDCCH may be associated with at least one subcarrier waveform without a cyclic prefix (CP). The PDSCH may be associated with at least one CP-orthogonal frequency division multiplexing access (OFDMA).

In accordance with some embodiments, a method may include transmitting, by a network entity, at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, an apparatus may include means for transmitting at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, an apparatus may include at least one processor and at least one memory including computer program code. The at least one memory and the computer program code can be configured to, with the at least one processor, cause the apparatus to at least transmit at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, a non-transitory computer readable medium can be encoded with instructions that may, when executed in hardware, perform a method. The method may transmit at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, a computer program product may perform a method. The method may transmit at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, an apparatus may include circuitry configured to transmit at least one physical downlink shared channel (PDSCH) slot. The PDSCH comprises at least one subcarrier waveform without a cyclic prefix (CP) and/or at least one CP-orthogonal frequency division multiplexing access (OFDMA).

In accordance with some embodiments, a method may include transmitting, by a network entity, at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, an apparatus may include means for transmitting at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, an apparatus may include at least one processor and at least one memory including computer program code. The at least one memory and the computer program code can be configured to, with the at least one processor, cause the apparatus to at least transmit at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, a non-transitory computer readable medium can be encoded with instructions that may, when executed in hardware, perform a method. The method may transmit at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, a computer program product may perform a method. The method may transmit at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, an apparatus may include circuitry configured to transmit at least one physical downlink control channel (PDCCH) slot. The at least one PDCCH is transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) is transmitted either by using CP-orthogonal frequency division multiplexing access (OFDMA) and/or DFT-S-OFDM.

In accordance with some embodiments, a method may include transmitting, by a network entity, at least one physical downlink shared control channel (PDSCH) comprising one or more layers from at least one transmission reception point (TRP). At least one layer is associated with another TRP.

In accordance with some embodiments, an apparatus may include means for transmitting at least one physical downlink shared control channel (PDSCH) comprising one or more layers from at least one transmission reception point (TRP). At least one layer is associated with another TRP.

In accordance with some embodiments, an apparatus may include at least one processor and at least one memory including computer program code. The at least one memory and the computer program code can be configured to, with the at least one processor, cause the apparatus to at least transmit at least one physical downlink shared control channel (PDSCH) comprising one or more layers from at least one transmission reception point (TRP). At least one layer is associated with another TRP.

In accordance with some embodiments, a non-transitory computer readable medium can be encoded with instructions that may, when executed in hardware, perform a method. The method may transmit at least one physical downlink shared control channel (PDSCH) comprising one or more layers from at least one transmission reception point (TRP). At least one layer is associated with another TRP.

In accordance with some embodiments, a computer program product may perform a method. The method may transmit at least one physical downlink shared control channel (PDSCH) comprising one or more layers from at least one transmission reception point (TRP). At least one layer is associated with another TRP.

In accordance with some embodiments, an apparatus may include circuitry configured to transmit at least one physical downlink shared control channel (PDSCH) comprising one or more layers from at least one transmission reception point (TRP). At least one layer is associated with another TRP.

BRIEF DESCRIPTION OF THE DRAWINGS

For proper understanding of the invention, reference should be made to the accompanying drawings, wherein:

FIGS. 2a-d illustrate various examples of methods performed by a network entity according to certain embodiments.

DETAILED DESCRIPTION

Figure 1:
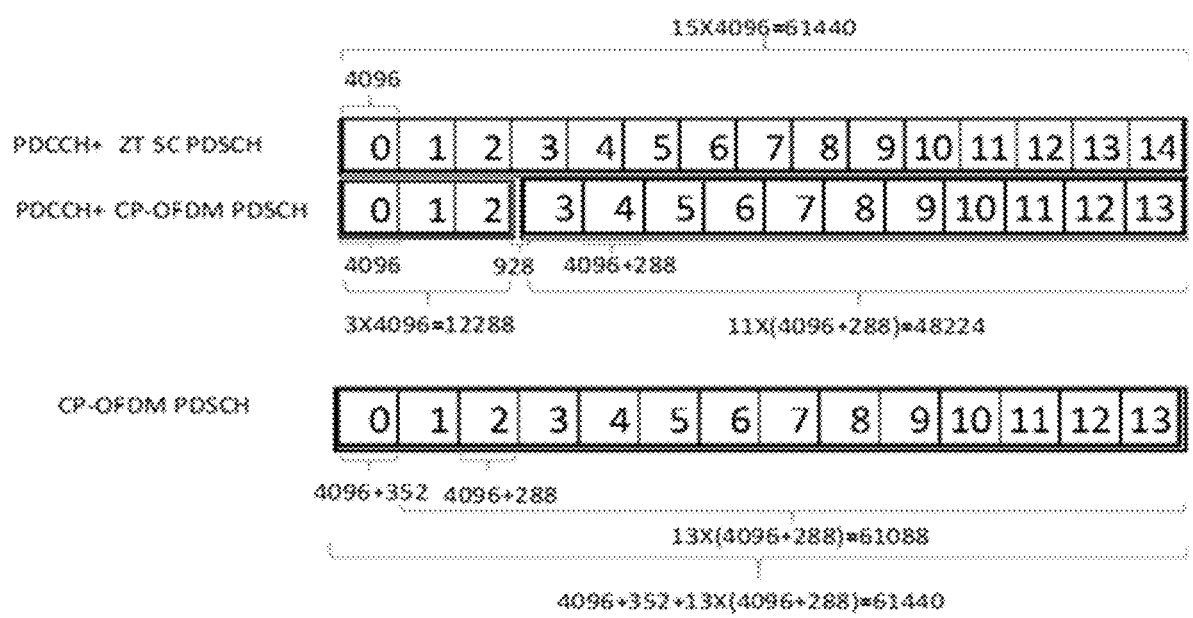
FIG. 1 illustrates an example of a physical downlink control channel according to certain embodiments.

Certain embodiments discussed herein may provide new slot formats to support dynamic allocation between SC and CP-OFDMA, such as a PDCCH of block size 4096 bytes, as illustrated in FIG. 1. For example, some embodiments may facilitate output back-off reduction on the downlink since both PDCCH and PDSCH may be transmitted using low peak-to-average power ratio. In addition, a downlink joint operation may be possible with low PAR SC waveforms without cyclic prefix and CP-OFDMA, while also maintaining a new radio framework. This may be associated with $2^n$ scaling of subcarrier spacing, IFFT/FFT block length $2^n$, clock rate $2^n$ related to LTE, and/or symbol aligned at the subframe level. Certain embodiments are, therefore, directed to improvements in computer-related technology, specifically, by conserving network resources and reducing power consumption of the UE and/or a network entity located within the network.

FIG. 2a illustrates an example of a method according to certain embodiments. In step 201, a network entity, such as NE 320 illustrated in FIG. 3, may transmit at least one physical downlink slot containing at least one physical downlink shared channel (PDSCH) and at least one physical downlink control channel (PDCCH). In some embodiments, at least one additional guard interval may separate the PDCCH and the PDSCH. For example, at least one guard interval may be fixed in the specification, configured by the network, determined based on physical layer numerology such as subcarrier spacing, and/or dynamically indicated in the scheduling assignment. In addition, the at least one PDCCH may comprise at least one symbol more than the at least one PDSCH. The at least one PDCCH may use higher subcarrier spacing than the at least one PDSCH. The at least one PDCCH may use shorter symbols than the at least one PDSCH. The at least one PDSCH comprises a plurality of minislots, wherein each minislot targets a different beam.

FIG. 2b illustrates an example of a method according to certain embodiments. In step 203, a network entity, such as NE 320 illustrated in FIG. 3, may transmit at least one slot containing at least one physical downlink shared channel (PDSCH). The at least one PDSCH may be associated with at least one subcarrier waveform without a cyclic prefix (CP) and/or at least one CP-orthogonal frequency division multiplexing access (OFDMA). In some embodiments, one or more of the at least one PDSCH slot associated with at least one subcarrier waveform without a CP may comprise at least one symbol more than one or more of the at least one PDSCH slot associated with CP-OFDMA. In various embodiments, the CP of the first of the at least one CP-OFDMA symbol may comprise more samples than the remaining at least one CP-OFDMA symbols.

In various embodiments, the CP-OFDMA PDSCH may be used for multiple-input multiple-output (MIMO) and higher order modulations. In addition, higher order modulations may be 64 quadrature amplitude modulation. The at least one subcarrier waveform without a CP may be configured for low order modulations, for example, binary phase shift keying (BPSK) and quadrature phase shift keying (QPSK). The at least one subcarrier waveform without a CP may be configured to utilize spectral shaping associated with at least one peak-to-average ratio (PAR). In some embodiments, the CP-OFDMA PDSCH may be used for certain modulation and coding schemes while the subcarrier waveform without a CP may be used for other modulation and coding schemes. The network may configure the UE such that a mapping and the downlink assignment may indicate the subcarrier waveform via the modulation and coding scheme field. In some embodiments, one or more of the at least one PDSCH slot associated with at least one subcarrier waveform without a CP and the one or more of the at least one PDSCH slot associated with CP-OFDMA may comprise the same number of symbols. One or more of the at least one PDSCH slot associated with at least one subcarrier waveform without a CP may be aligned with one or more of the at least one PDSCH slot associated with CP-OFDMA through a guard interval.

FIG. 2c illustrates an example of a method according to certain embodiments. In step 205, a network entity, such as NE 320 illustrated in FIG. 3, may transmit at least one physical downlink slot. The at least one PDCCH may be transmitted according to at least one zero tail discrete fourier transform (DFT)-spread-orthogonal frequency division multiplexing (S-OFDM) with at least one zero power cyclic prefix (CP). At least one physical downlink shared control channel (PDSCH) may be transmitted either by using CP-orthogonal frequency division multiplexing access (OFDMA) and/or DFT-S-OFDM.

In some embodiments, at least one zero tail may be associated with at least one cyclic prefix, and/or may be configured to provide protection against delay spread and guard time for beam switching. The PDCCH may be broadcast to multiple user equipment by a beam that is wider than the beam transmitting at least one PDSCH to a single user equipment. In addition, the at least one PDCCH may use higher subcarrier spacing than the at least one PDSCH. In various embodiments, the at least one PDCCH may use shorter symbols than the at least one PDSCH.

FIG. 2d illustrates an example of a method according to certain embodiments. In step 207, a network entity, such as NE 320 illustrated in FIG. 3, may transmit at least one physical downlink shared control channel (PDSCH) comprising one or more layers from at least one transmission reception point (TRP). In some embodiments, at least one layer may be associated with another TRP. At least one symbol of the PDSCH may be different from at least one TRP to be aligned in time when non-coherent joint transmission (NCJT) is applied.

In some embodiments, at least one symbol of the PDSCH may be different from at least one TRP to be aligned in time when non-coherent joint transmission (NCJT) is applied. In addition, when a first TRP comprises a first format, and a second TRP comprises a second format, one of the first TRP and second TRP may be configured to comprise fewer symbols and/or insert at least one gap interval to align symbols of the first TRP and second TRP in the portion of the frame where NCJT is applied.

In various embodiments, at least one symbol of the PDSCH may be different from at least one TRP to be aligned in time when non-coherent joint transmission (NCJT) is applied. The method may further include transmitting one or more of at least one location and at least one duration of the gap in the slot format to at least one user equipment.

Figure 3:
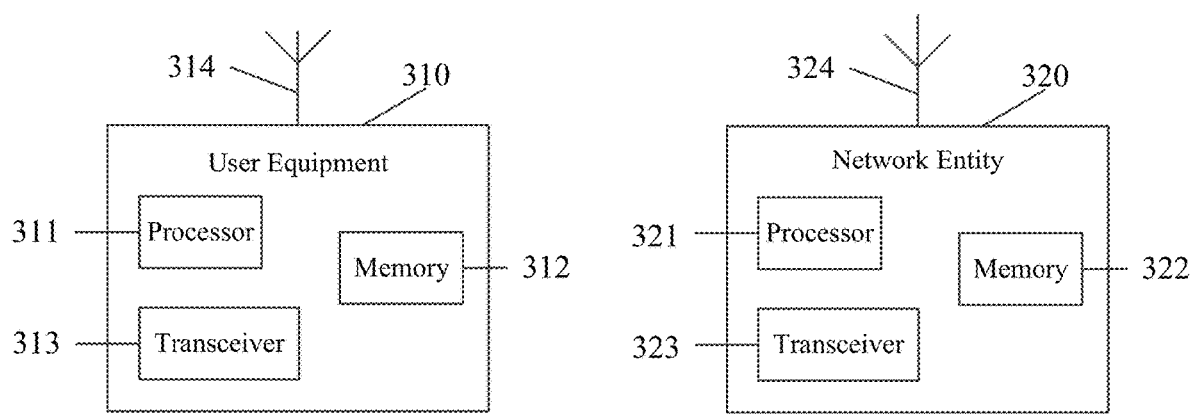
FIG. 3 illustrates a system according to certain embodiments.

FIG. 3 illustrates a system according to certain embodiments. It should be understood that each signal or block in FIGS. 1-2 may be implemented by various means or their combinations, such as hardware, software, firmware, one or more processors and/or circuitry. In one embodiment, a system may include several devices, such as, for example, user equipment 310 and/or network entity 320. The system may include more than one user equipment 310 and more than one network entity 320.

User equipment 314 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Network entity 320 may be a CBSD, a base station, an access point, an access node, an eNB, a gNB, a server, a host, a MME, a S-GW, a P-GW, a PCRF, a P-CSCF, E/CSCF, or any other network entity that may communicate with user equipment 310.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceivers 313 and 323 may be provided, and each device may also include an antenna, respectively illustrated as 314 and 324. Although only one antenna each is shown, many antennas and multiple antenna elements may be provided to each of the devices. Other configurations of these devices, for example, may be provided. For example, user equipment 310 and/or network entity 320 may be additionally configured for wired communication, in addition to wireless communication, and in such a case, antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a user equipment or a network node, may include means for carrying out embodiments described above in relation to FIGS. 1-2. In certain embodiments, at least one memory including computer program code can be configured to, with the at least one processor, cause the apparatus at least to perform any of the processes described herein.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user equipment 310 and/or network entity 320, to perform any of the processes described above (see, for example, FIGS. 1-2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 3 illustrates a system including a user equipment 310 and/or network entity 320, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. User equipment 310 may likewise be provided with a variety of configurations for communication other than communicating with network entity 320. For example, user equipment 310 may be configured for device-to-device, machine-to-machine, or vehicle-to-vehicle communication.

As shown in FIG. 3, transceivers 313 and 323 may be provided, and one or more devices may also include at least one antenna, respectively illustrated as 314 and 324. The device may have many antennas, such as an array of antennas configured for multiple input multiple output (MIMO) communications, or multiple antennas for multiple radio access technologies. Other configurations of these devices, for example, may be provided.

Transceivers 313 and 323 may be a transmitter, a receiver, or both a transmitter and a receiver, or a unit or device that may be configured both for transmission and reception.

Processors 311 and 321 may be embodied by any computational or data processing device, such as a central processing unit (CPU), application specific integrated circuit (ASIC), or comparable device. The processors may be implemented as a single controller, or a plurality of controllers or processors.

Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-2). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-2. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied to any communication network or wireless system. While many of the above embodiments refer to LTE or LTE-A, other embodiments may be used for 3GPP fifth generation (5G) technology, fourth generation (4G) technology, New Radio (NR) technology, and/or any wireless land access network (WLAN).

Partial Glossary

3GPP Third Generation Partnership Project
5G Fifth Generation
CP Cyclic Prefix
DFT Discrete Fourier Transform
DL Downlink
DMRS Demodulation Reference Signal
eNB Evolved Node B
FDM Frequency-Division Multiplexing
FDMA Frequency-Division Multiple Access
FFT Fast Fourier Transform
gNB 5G Base Station
ISI Inter Carrier Interference
LTE Long Term Evolution
MBMS Multimedia Broadcast Multicast Service
MIMO Multiple-Input Multiple-Output
MU-MIMO Multi-User MIMO
NR New Radio
OFDM Orthogonal FDM
PDSCH Physical Downlink Shared Channel
PDCCH Physical Downlink Control Channel
PRB Physical Resource Block
RE Resource Element
SCS Sub Carrier Spacing
UE User Equipment
UL Uplink
ZH Zero Head
ZT Zero Tail

We claim:

1. An apparatus, comprising:
at least one memory comprising computer program code;
at least one processor;
wherein the at least one memory and the computer program code are configured, with the at least one processor, to cause the apparatus at least to:
transmit at least one physical downlink slot containing at least one physical downlink shared channel (PDSCH) and at least one physical downlink control channel (PDCCH), wherein
the at least one PDCCH is associated with at least one subcarrier waveform without a cyclic prefix (CP),
the at least one PDSCH is associated with at least one CP-orthogonal frequency division multiplexing (OFDM) or single carrier (SC) waveform, and
at least one additional guard interval separates the at least one PDCCH and the at least one PDSCH when the at least one PDSCH is associated with CP-OFDM waveform, wherein one or more of the at least one physical downlink slot containing at least one PDSCH associated with at least one SC waveform is aligned with the at least one PDSCH associated with CP-OFDM waveform through the guard interval.

2. The apparatus according to claim 1, wherein the at least one PDSCH associated with SC-waveform comprises at least one symbol more than the at least one PDSCH associated with CP-OFDM waveform.

3. The apparatus according to claim 1, wherein the at least one PDCCH uses higher subcarrier spacing than the at least one PDSCH.

4. The apparatus according to claim 1, wherein the at least one PDCCH is broadcast to a plurality of user equipment by at least one beam that is wider than the beam transmitting at least one PDSCH to a single user equipment.

5. An apparatus, comprising:
at least one memory comprising computer program code;
at least one processor;
wherein the at least one memory and the computer program code are configured, with the at least one processor, to cause the apparatus at least to:
transmit at least one slot containing at least one physical downlink shared channel (PDSCH), wherein the at least one PDSCH is associated with:
at least one subcarrier waveform without a cyclic prefix (CP) and/or at least one CP-orthogonal frequency division multiplexing (OFDM),
wherein one or more of the at least one slot containing at least one PDSCH associated with at least one subcarrier waveform without CP is aligned with the at least one PDSCH associated with CP-OFDM waveform through an additional guard interval.

6. The apparatus according to claim 5, wherein one or more of the at least one slot associated with at least one subcarrier waveform without a CP comprises at least one symbol more than one or more of the at least one PDSCH slot associated with CP-OFDM.

7. The apparatus according to claim 5, wherein the CP of the first of the at least one CP-OFDM symbol comprise more samples than the remaining at least one CP-OFDM symbols.

8. The apparatus according to claim 5, wherein at least one block size is 4096 bytes.

9. The apparatus according to claim 5, wherein at least one PDSCH associated with CP-OFDM consists of 14 or more symbols.

10. The apparatus according to claim 5, wherein at least one CP of the at least one CP-OFDM comprises 352 samples, and the remaining at least one CP comprises 288 samples.

11. The apparatus according to claim 5, wherein PDSCH is associated with subcarrier waveform without a cyclic prefix (CP) comprising 15 symbols.

12. An apparatus, comprising:
at least one memory comprising computer program code;
at least one processor;
wherein the at least one memory and the computer program code are configured, with the at least one processor, to cause the apparatus at least to:
transmit at least one physical downlink slot containing at least one physical downlink control channel (PDCCH), wherein the at least one PDCCH is transmitted according to at least one zero tail discrete fourier transform (DFT)-spread-orthogonal frequency division multiplexing (S-OFDM) with at least one zero or low power cyclic prefix (CP), wherein
at least one physical downlink shared control channel (PDSCH) is transmitted either by using CP-orthogonal frequency division multiplexing access (OFDMA) and/or DFT-S-OFDM,
wherein the at least one PDSCH transmitted by using DFT-S-OFDM is aligned with the at least one PDSCH transmitted by using CP-OFDMA through a guard interval.

13. The apparatus according to claim 12, wherein zero tail is associated with at least one cyclic prefix, and is configured to provide protection against delay spread and guard time for beam switching.

14. The apparatus according to claim 12, wherein the PDCCH is broadcast to multiple user equipment by a beam that is wider than the beam transmitting at least one PDSCH to a single user equipment.

15. The apparatus according to claim 12, wherein the at least one PDCCH uses higher subcarrier spacing than the at least one PDSCH.

16. An apparatus, comprising:
at least one memory comprising computer program code;
at least one processor;
wherein the at least one memory and the computer program code are configured, with the at least one processor, to cause the apparatus at least to:
transmit at least one physical downlink shared control channel (PDSCH) comprising one or more layers from at least one transmission reception point (TRP), wherein
at least one layer is associated with another TRP, and
one or more of at least one slot containing at least one PDSCH associated with at least one subcarrier waveform without CP is aligned with the at least one PDSCH associated with CP-OFDM waveform through an additional guard interval.

17. The apparatus according to claim 16, wherein at least one symbol of the PDSCH is different from at least one TRP to be aligned in time when non-coherent joint transmission (NCJT) is applied.

18. The apparatus according to claim 16, wherein, when a first TRP comprises a first format, and a second TRP comprises a second format, one of the first TRP and second TRP are configured to comprise fewer symbols and/or insert at least one gap interval to align symbols of the first TRP and second TRP in the portion of the frame where NCJT is applied.

19. The apparatus according to claim 16, further comprising:
transmit one or more of at least one location and at least one duration of the gap in the slot format to at least one user equipment.

* * * * *